US008271027B2

(12) United States Patent
Yonekubo

(10) Patent No.: US 8,271,027 B2
(45) Date of Patent: Sep. 18, 2012

(54) MOBILE TERMINAL DEVICE

(75) Inventor: Shunichi Yonekubo, Tokyo (JP)

(73) Assignee: Panasonic Corporation, Osaka (JP)

(*) Notice: Subject to any disclaimer, the term of this patent is extended or adjusted under 35 U.S.C. 154(b) by 391 days.

(21) Appl. No.: 12/440,863

(22) PCT Filed: Sep. 12, 2006

(86) PCT No.: PCT/JP2006/318080
§ 371 (c)(1),
(2), (4) Date: Mar. 11, 2009

(87) PCT Pub. No.: WO2008/032369
PCT Pub. Date: Mar. 20, 2008

(65) Prior Publication Data
US 2010/0041432 A1    Feb. 18, 2010

(51) Int. Cl.
*H04M 1/00* (2006.01)
(52) U.S. Cl. ....... 455/552.1; 725/62; 725/133; 725/141; 348/14.01; 348/14.04; 348/552; 379/102.03
(58) Field of Classification Search ............... 455/550.1, 455/551.1, 556.1, 566, 552.1, 432.1–433, 455/414.1; 725/62; 379/102.03
See application file for complete search history.

(56) References Cited

U.S. PATENT DOCUMENTS

| 6,166,776 | A | 12/2000 | Moon |
| 2005/0028209 | A1* | 2/2005 | Sinisalo ........................... 725/62 |
| 2006/0142052 | A1* | 6/2006 | Lai et al. ..................... 455/552.1 |
| 2006/0213967 | A1* | 9/2006 | Chuang et al. ................. 235/375 |
| 2007/0226764 | A1* | 9/2007 | Melin ............................ 725/62 |
| 2009/0011758 | A1 | 1/2009 | Aoki et al. |

FOREIGN PATENT DOCUMENTS

| EP | 1003333 A1 | 5/2000 |
| JP | 2001-136538 A | 5/2001 |
| JP | 2001-147683 A | 5/2001 |
| JP | 2002-314646 A | 10/2002 |
| JP | 2004-104586 A | 4/2004 |
| JP | 2004-514347 A | 5/2004 |
| JP | 2004-208274 A | 7/2004 |
| JP | 2005-080057 A | 3/2005 |

(Continued)

OTHER PUBLICATIONS

International Search Report for PCT/JP2006/318080.

(Continued)

*Primary Examiner* — Olumide T Ajibade Akonai
*Assistant Examiner* — Alexander Yi
(74) *Attorney, Agent, or Firm* — Pearne & Gordon LLP

(57) ABSTRACT

A mobile terminal device equipped with radio communicating portions capable of holding a radio communication in accordance with a predetermined communication standard, and a standard signal outputting portion for outputting a signal in a format based on a predetermined signaling system to any display device prepared on an outside, includes a communication standard detecting means for detecting a type of the communication standard selected based on operating conditions of radio communicating portions, when one of the radio communicating portions conforms to plural types of communication standards or when a plurality of radio communicating portions conform to plural types of communication standards respectively, and a signaling system selecting means for selecting automatically a signaling system of the signal that the standard signal outputting portion outputs, in response to the type of the communication standard that the communication standard detecting means detects.

13 Claims, 10 Drawing Sheets

FOREIGN PATENT DOCUMENTS

| | | |
|---|---|---|
| JP | 2005-130176 A | 5/2005 |
| JP | 2006-86730 A | 3/2006 |
| JP | 2006-129002 A | 5/2006 |
| WO | 2004-025959 A1 | 3/2004 |
| WO | 2005/029886 A1 | 3/2005 |
| WO | 2007-107177 A1 | 9/2007 |

OTHER PUBLICATIONS

European Search Report for the corresponding European patent application 06797872.6-1246 dated Mar. 30, 2011.

* cited by examiner

| | OPERATING RADIO PORTION | TV SIGNALING SYSTEM |
|---|---|---|
| A | GSM | PAL |
| B | PDC | NTSC |
| C | W-CDMA | NTSC |
| D | UMTS | PAL |
| | ⋮ | ⋮ |

| CURRENT REGION (COUNTRY) | TV SIGNALING SYSTEM |
|---|---|
| JAPAN | NTSC |
| CHINA | PAL |
| SPAIN | PAL |
| FRANCE | SECAM |
| ⋮ | ⋮ |

MOBILE TERMINAL DEVICE

TECHNICAL FIELD

The present invention relates to a mobile terminal device such as a cellular phone terminal, a mobile information terminal, PHS (Personal Handyphone System) terminal, or the like and, more particularly, a mobile terminal device capable of outputting a signal in a format based on a predetermined signaling system to an external display device such as a television monitor prepared on the outside.

BACKGROUND ART

In recent times, various functions are provided to the cellular phone terminal or the mobile information terminal. In particular, the terminal that has a function of shooting a photograph or a moving picture with a camera and displaying the image picked up by the shooting on its own display portion is increased in number. Also, often such mobile terminal device is equipped with a function of outputting the image picked up by the shooting to an external device.

For example, as disclosed in Patent Literature 1, it has been proposed in which the image shot by the mobile terminal device should be displayed on a screen of the television set by inputting the signal output from the mobile terminal device into the television set.

Patent Literature 1: JP-A-2005-130176

DISCLOSURE OF THE INVENTION

Problems that the Invention is to Solve

In order to input the image or sound signals picked up by the mobile terminal device into the television set, it is desirable that the signals should be output from the mobile terminal device by using the signal format based on the standard of the television broadcast. For example, in case the signal is adapted to the television set that receives the analog broadcast in Japan, the television signals must be output from the mobile terminal device by using the signal format based on the NTSC system.

However, there is a great difference in the signaling system of the television set every region. More particularly, the signal format based on the NTSC system is employed in the regions containing respective countries such as Japan, America, Canada, etc., the signal format based on the PAL system is employed in the regions such as Germany, Britain, the Netherlands, etc., and the signal format based on the SECAM system is employed in the regions such as France, Saudi Arabia, Russia, etc.

Therefore, when the mobile terminal devices of the same type are sold in various regions or when the user who carries one mobile terminal device on a trip travels around a plurality of countries, incompatibility in signaling systems occurs between the signals output by the mobile terminal device and the television set that receives the signals. For example, the user uses the mobile terminal device that outputs the signals according to the NTSC system in Germany, the signals output by the mobile terminal device cannot be displayed on a screen of the television set, for the signaling system of the television set is the PAL system.

For this reason, when a tourist or a businessperson travels around a plurality of countries, for example, either he or she must prepares in advance the special mobile terminal device that can meet the communication standards in the countries as destinations of travel or he or she must possesses a plurality of mobile terminal devices of different types. Also, even when the same user possesses a plurality of mobile terminal devices, the user must check the communication standards in the countries as destinations of travel by user's self and then use selectively one of a plurality of mobile terminal devices.

It is an object of the present invention to provide a mobile terminal device capable of displaying correctly signals output by the mobile terminal by using a television set, or the like in a region as a destination of travel even when a user of the mobile terminal travels around a plurality of regions such as a plurality of countries, or the like.

Means for Solving the Problems

A mobile terminal device of the present invention equipped with at least one radio communicating portion capable of holding a radio communication in accordance with a predetermined communication standard, and a standard signal outputting portion for outputting a signal in a format based on a predetermined signaling system to any display device prepared on an outside, includes a communication standard detecting means for detecting a type of the communication standard selected based on operating condition or conditions of one or a plurality of radio communicating portions when one of the radio communicating portions conforms to plural types of communication standards or when the plurality of radio communicating portions conform to plural types of communication standards respectively; and a signaling system selecting means for selecting automatically a signaling system of the signal output by the standard signal outputting portion, in response to the type of the communication standard that the communication standard detecting means detects.

The signaling systems to which the television sets conform are varied in response to differences of regions such as countries, or the like. In this case, it is common that simultaneously the communication standards to which the signaling system utilized by the cellular phone terminal, or the like in the radio communication corresponds are also varied so as to reflect the difference of the region. For example, the communication standards such as GSM, PDC, W-CDMA, UMTS, etc. are employed independently every region. As a result, the mobile terminal device can specify the section of region if it can know the communication standard to which the signaling system corresponds. Also, the mobile terminal device can specify the signaling system (NTSC, PAL, SECAM, or the like) to which the television set, or the like conforms, based on the specified section of region.

In the present invention, the format of the signal to be output by the standard signal outputting portion can be selected automatically to meet the signaling system to which the external television set used actually conforms. In other words, when the radio communicating portion conforms solely to plural types of communication standards or when a plurality of radio communicating portions conform to different communication standards respectively, the mobile terminal device can discriminate the communication standard to which the signaling system that is available in the current region (country) corresponds, by checking the operating states of one or plural radio communicating portions. Therefore, the region (country) can be specified, and also the signaling system to which the television set, or the like conforms in the concerned region can be specified. As a result, even when the user utilizes one mobile terminal device while carrying into various countries, the mobile terminal device can deal automatically with the difference in the signaling systems depending on the difference of the regions.

Also, as another mode of the present invention, the mobile terminal device further includes a conversion table in which information representing signaling systems that are correlated with a plurality of communication standards respectively are held in advance; wherein the signaling system selecting means acquires information representing the concerned signaling system by referring to the conversion table based on the type of the communication standard detected by the communication standard detecting means, and decides the format of the signal to be output by the standard signal outputting portion, based on the information.

According to this configuration, the information representing the signaling systems that are correlated with a plurality of communication standards respectively are held in advance on the conversion table. Therefore, the adequate signaling system can be specified from the type of the communication standard detected by the communication standard detecting means, by referring to the conversion table. Also, there is no necessity to specify the region.

Also, as still another mode of the present invention, when a plurality of radio communicating portions that conform to plural types of communication standards respectively are provided, the communication standard detecting means checks whether or not a plurality of radio communicating portions are in operation respectively, and detects the type of the communication standard to which the radio communicating portion that is in operation corresponds.

According to this configuration, a plurality of radio communicating portions conform to different types of communication standards respectively. Therefore, the mobile terminal device can specify the communication standard to which the signaling system in the region where the terminal device is located corresponds, by specifying the radio communicating portion that is now in operation.

Also, another mobile terminal device of the present invention equipped with at least one radio communicating portion capable of holding a radio communication in accordance with a predetermined communication standard, and a standard signal outputting portion for outputting a signal in a format based on a predetermined signaling system to any display device prepared on an outside, includes a base station information acquiring means for acquiring information such as a distinction of countries to specify a region where the terminal device is located or information representing types of the communication standards to which a radio base station corresponds, as base station information by using the radio communicating portion from the radio base station as a destination of communication when one of the radio communicating portions conforms to plural types of communication standards or when the plurality of radio communicating portions conform to plural types of communication standards respectively; and a signaling system selecting means for selecting automatically a signaling system of the signal to be output by the standard signal outputting portion, based on the base station information acquired by the base station information acquiring means.

According to this configuration, the radio communicating portion installed into the terminal device itself acquires the base station information by communicating with the predetermined base station. Therefore, the region (country) where the terminal device itself is located can be specified or the type of the communication standard to which the base station corresponds can be specified. The signaling system selecting means selects automatically the signaling system of the signal to be output by the standard signal outputting portion. Therefore, the signals that conform to the signaling systems (NTSC, PAL, SECAM, or the like) to which the television set used actually conforms can be output.

Also, as another mode of the present invention, another mobile terminal device of the present invention further includes a region conversion table in which information representing the communication standards or signaling systems that are correlated with a plurality of regions indicating distinction of countries, or the like respectively are held in advance; wherein the signaling system selecting means refers to the region conversion table based on the base station information that the base station information acquiring means acquired, and decides the signaling system of the signal to be selected, based on a referred result.

According to this configuration, the information representing the communication standards or the signaling systems that are correlated with a plurality of regions to indicate the distinction of countries, or the like respectively are held in advance on the region conversion table. Therefore, the signaling system selecting means can specify the concerned communication standard or signaling system from the base station information acquired by the base station information acquiring means, by referring the region conversion table.

Also, still another mobile terminal device of the present invention equipped with at least one radio communicating portion capable of holding a radio communication in accordance with a predetermined communication standard, and a standard signal outputting portion for outputting a signal in a format based on a predetermined signaling system to any display device prepared on an outside, includes a position information acquiring means for acquiring position information representing a current position of the terminal device itself; a region specifying means for specifying a region such as a distinction of countries where the terminal device itself is located, based on the position information acquired by the position information acquiring means; and a signaling system selecting means for selecting automatically a signaling system of the signal to be output by the standard signal outputting portion, based on the information of the current region specified by the region specifying means.

According to this configuration, the region specifying means specifies the region such as the distinction of countries where the terminal device itself is located based on the position information the position information acquiring means acquired. Therefore, the signaling system that is employed in the specified region can be specified, and the signal format suitable for the concerned region can be selected automatically. In this case, when the commercially available GPS (Global Positioning System) receiver, for example, is employed as the position information acquiring means, the position coordinates (latitude/longitude) can be detected. Also, the region such as the country can be specified by comparing the position coordinates with map information.

Also, as another mode of the present invention, still another mobile terminal device of the present invention further includes a region conversion table in which information representing the communication standards or signaling systems that are correlated with a plurality of regions indicating distinction of countries, or the like respectively are held in advance; wherein the signaling system selecting means refers to the region conversion table based on the information of the current region specified by the region specifying means, and decides the signaling system of the signal to be selected, based on a referred result.

According to this configuration, the information representing the communication standards or signaling systems that are correlated with a plurality of regions indicating distinction of countries, or the like respectively are held in advance on the region conversion table. Therefore, the signaling system selecting means can decide the signaling system to be selected from the information of the current region specified by the region specifying means, by referring to the region conversion table.

Advantages of the Invention

According to the present invention, even when the user of the terminal travels across plural regions such as plural countries, or the like in which the signaling system (NTSC, PAL, SECAM, or the like) employed in the display device is different respectively, the signals output by the terminal by using the television set or the like in the region as the destination of travel can be displayed correctly.

BRIEF DESCRIPTION OF THE DRAWINGS

[FIG. 5] A schematic view showing a configurative example of a table installed into the mobile terminal device shown in FIG. 3.

[FIG. 8] A schematic view showing a configurative example of a table installed into the mobile terminal device shown in FIG. 6.

Figure 1:
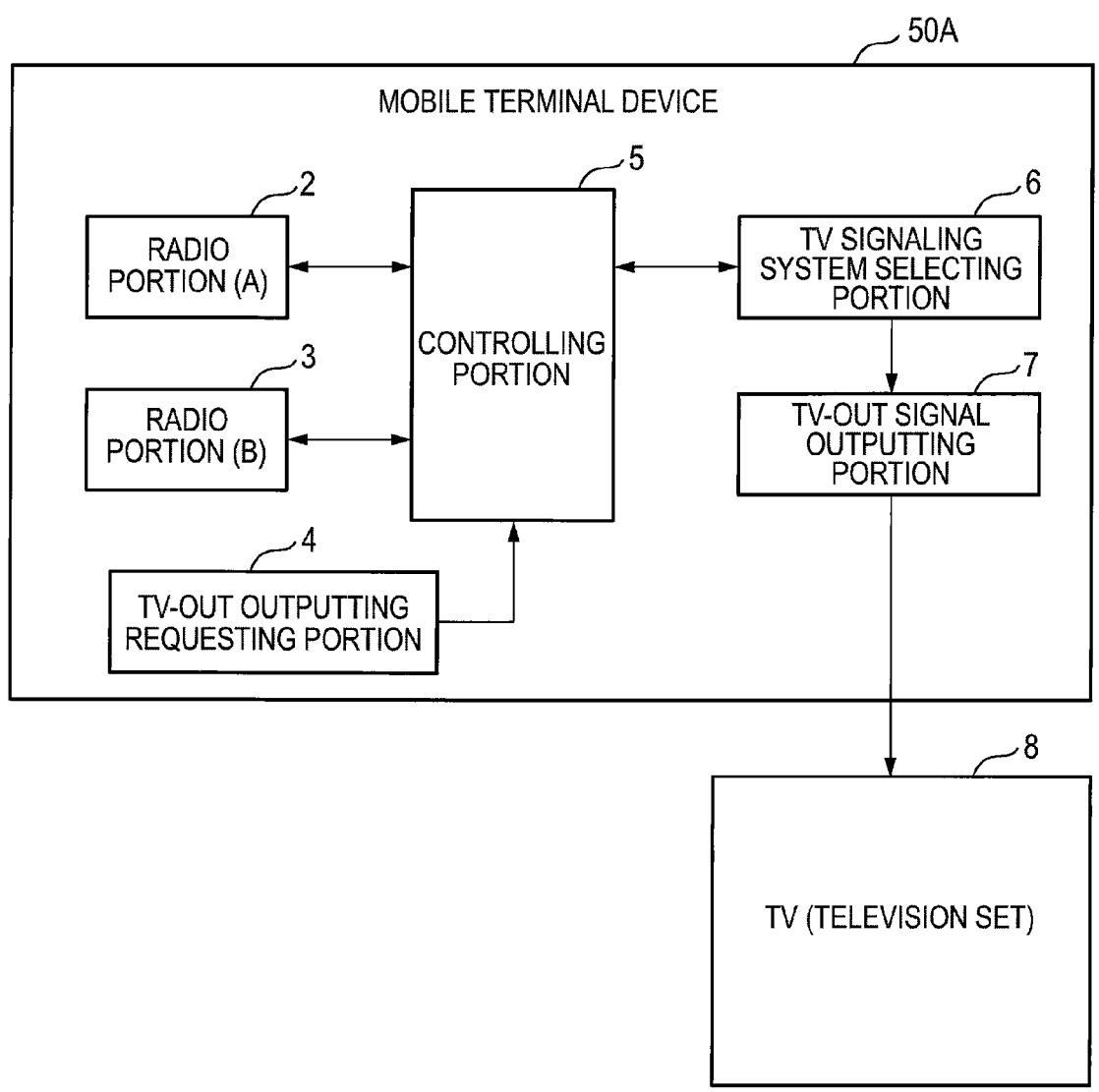
[FIG. 1] A block diagram showing a configuration of principal portions of a mobile terminal device in a first embodiment of the present invention.

DESCRIPTION OF REFERENCE NUMERALS AND SIGNS 2, 3, 9, 10 radio portion
4 TV-OUT outputting requesting portion
5, 5B, 5C, 5D controlling portion
6, 6B, 6C, 6D TV signaling system selecting portion
7 TV-OUT signal outputting portion
8 television set
11 radio portion
12 base station
13 GPS receiving portion
21, 22 table
50A, 50B, 50C, 50D mobile terminal device

BEST MODE FOR CARRYING OUT THE INVENTION (First Embodiment)

Figure 2:
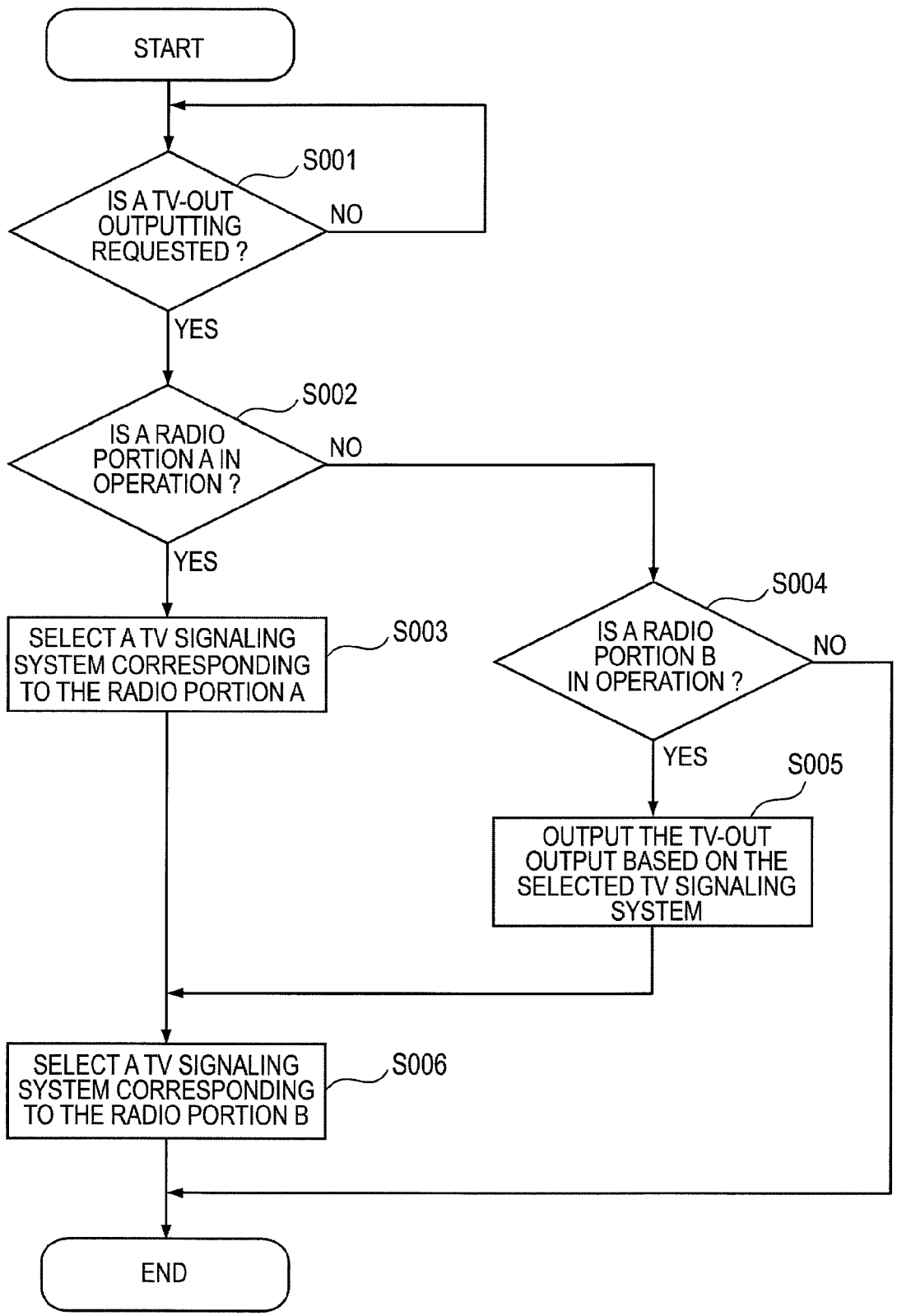
[FIG. 2] A flowchart showing principal operations of the mobile terminal device shown in FIG. 1.

An embodiment of a mobile terminal device of the present invention will be explained with reference to FIG. 1 and FIG. 2 hereinafter. FIG. 1 is a block diagram showing a configuration of principal portions of a mobile terminal device in a first embodiment of the present invention. FIG. 2 is a flowchart showing principal operations of the mobile terminal device shown in FIG. 1.

As shown in FIG. 1, a mobile terminal device 50A is equipped with a radio portion 2, a radio portion 3, a TV-OUT outputting requesting portion 4, a controlling portion 5, a TV signaling system selecting portion 6, and a TV-OUT signal outputting portion 7.

In this case, as the particular mobile terminal device 50A, the cellular phone terminal, the mobile information terminal (PDA), the PHS terminal, or the like is assumed.

The radio portion 2 is a circuit equipped with a radio communication function that is necessary for the mobile terminal device 50A to perform a function of a cellular phone, or the like. The radio portion 2 is constructed to hold a communication according to a predetermined communication standard (for example, PDC, CDMA2000, W-CDMA, GSM, or the like).

Like the radio portion 2, the radio portion 3 is a circuit equipped with a radio communication function that is necessary for the mobile terminal device 50A to perform a function of a cellular phone, or the like. The radio portion 3 is constructed to hold a communication according to the communication standard that is different from the communication standard to which the radio portion 2 corresponds.

Actually, it is assumed that, for example, the radio portion 2 is constructed to meet the communication standard of (W-CDMA), and the radio portion 3 is constructed to meet the communication standard of (GSM). Accordingly, the user can hold a communication selectively in a communication mode that corresponds to two types of communication standards respectively, by switching the radio portion 2 and the radio portion 3. Therefore, the user can hold a communication according to the communication standard to which the signaling system corresponds, in either of a plurality of regions (countries). In this event, the communication standard to which the radio portion 2 corresponds and the communication standard to which the radio portion 3 corresponds may be varied in response to a situation of the region where the mobile terminal device 50A is sold, for example.

The TV-OUT signal outputting portion 7 is an electric circuit that outputs the television signal in the standard format decided based on the signaling system of a television set 8 connected to the outside of the mobile terminal device 50A. Also, the TV-OUT signal outputting portion 7 can deal with plural types of signaling systems (NTSC, PAL, SECOM), and can output the analog television signal in the standard format that meets the selected signaling system.

It is assumed that, in the television signal output by the TV-OUT signal outputting portion 7, information of images such as a photograph, a moving picture, etc. shot with a camera (not shown) installed into the mobile terminal device 50A and sounds, for example, are contained in a mode of the analog signal. As the television set 8 connected to the outside of the mobile terminal device 50A, the television receiver equipped with a function of receiving the broadcast wave, the television monitor equipped with a function of displaying the television signal that various equipments output on a screen, or the like is assumed.

The TV signaling system selecting portion 6 produces a control signal that switches the signal format of the television signal, which is output from the TV-OUT signal outputting portion 7 to the television set 8, to meet the signaling system and then outputs this control signal to the TV-OUT signal outputting portion 7.

The TV-OUT outputting requesting portion 4 is constructed by an inputting device such as an operable button, for example. The TV-OUT outputting requesting portion 4 issues a request (TV-OUT outputting request) regarding to that the TV-OUT signal outputting portion 7 starts the operation to output the analog television signal in the standard signaling system, in response to the inputting operation of the user. This request is applied to the controlling portion 5.

The controlling portion 5 controls respective portions in the mobile terminal device 50A in answer to the contents of the predetermined program and a change in situation. In this case, the controlling portion 5 may be constructed by a microprocessor or may be constructed by a hardware such as a logic circuit dedicated to control use.

The process procedures of characteristic operations regarding to the mobile terminal device 50A shown in FIG. 1 are shown in FIG. 2. In other words, contents of control applied to output the television signal in the standard format from the TV-OUT signal outputting portion 7 in the mobile terminal device 50A and then input the television signal into the television set 8 are shown in FIG. 2. Respective steps in FIG. 2 will be explained hereunder.

In step S001, the controlling portion 5 checks whether or not a predetermined TV-OUT outputting request is input from the TV-OUT outputting requesting portion 4. If the TV-OUT outputting requesting portion 4 outputs the TV-OUT outputting request in response to the inputting operation from the user, or the like, the process in the controlling portion 5 goes to step S002.

In step S002, the controlling portion 5 checks whether or not one radio portion 2 is in operation. If the radio portion 2 is in operation, the controlling portion 5 transmits the information indicating that the radio portion 2 is in operation, to the TV signaling system selecting portion 6. Then, the process goes to step S003. In contrast, if the radio portion 2 is not in operation, the process goes to step S004.

In step S003, the TV signaling system selecting portion 6 checks a state of the radio portion 2 based on the information input from the controlling portion 5 (the information indicating that the radio portion 2 is in operation). Then, the TV signaling system selecting portion 6 produces the control signal to select the signaling system (any one of NTSC, PAL, and SECAM) that is correlated in advance with the communication standard (any one of PDC, CDMA2000, W-CDMA, and GSM, for example) to which the radio portion 2 corresponds. Then, the TV signaling system selecting portion 6 outputs this control signal to the TV-OUT signal outputting portion 7.

In step S004, the controlling portion 5 checks whether or not the other radio portion 3 is in operation. If the radio portion 3 is in operation, the controlling portion 5 transmits the information indicating that the radio portion 3 is in operation, to the TV signaling system selecting portion 6. Then, the process goes to step S005.

In step S005, the TV signaling system selecting portion 6 checks a state of the radio portion 3 based on the information input from the controlling portion 5 (the information indicating that the radio portion 3 is in operation). Then, the TV signaling system selecting portion 6 produces the control signal to select the signaling system (any one of NTSC, PAL, and SECAM) that is correlated in advance with the communication standard (any one of PDC, CDMA2000, W-CDMA, and GSM, for example) to which the radio portion 3 corresponds. Then, the TV signaling system selecting portion 6 outputs this control signal to the TV-OUT signal outputting portion 7.

In step S006, the TV-OUT signal outputting portion 7 selects one signaling system (any one of NTSC, PAL, and SECAM) in accordance with the control signal output from the TV signaling system selecting portion 6, and outputs the television signal in the signal format that meets the communication standard.

Namely, if the radio portion 2 is in an operation state, the signaling system used to define the signal format of the television signal that the TV-OUT signal outputting portion 7 outputs is selected automatically based on the communication standard to which the radio portion 2 corresponds. If the radio portion 2 is in a non-operation state and also the radio portion 3 is in an operation state, the signaling system used to define the signal format of the television signal that the TV-OUT signal outputting portion 7 outputs is selected automatically based on the communication standard to which the radio portion 3 corresponds.

For example, if the radio portion 2 is in operation and the communication standard to which the radio portion 2 corresponds is (W-CDMA), the TV signaling system selecting portion 6 produces the control signal such that the TV-OUT signal outputting portion 7 selects the signaling system that is correlated with (W-CDMA). Also, if the radio portion 2 is not in operation and the radio portion 3 is in operation and the communication standard to which the radio portion 3 corresponds is (GSM), the TV signaling system selecting portion 6 produces the control signal such that the TV-OUT signal outputting portion 7 selects the signaling system that is correlated with (GSM).

Concretely, in many cases (NTSC) is employed as the signaling system of the television signal in the regions (countries) that employs the communication standard of (W-CDMA). Also, in many cases (PAL) is employed as the signaling system of the television signal in the regions (countries) that employs the communication standard of (GSM). Therefore, the TV signaling system selecting portion 6 may apply the control such that the signaling system of (NTSC) is correlated with the communication standard of (W-CDMA) and the signaling system of (PAL) is correlated with the communication standard of (GSM).

As a result, when the mobile terminal device 50A is holding communication by using the radio portion 2 according to the communication standard of (W-CDMA), (NTSC) is selected as the signaling system that defines the signal format of the television signal that the TV-OUT signal outputting portion 7 outputs. Also, when the mobile terminal device 50A is holding communication by using the radio portion 3 according to the communication standard of (GSM), (PAL) is selected as the signaling system that defines the signal format of the television signal that the TV-OUT signal outputting portion 7 outputs.

Of course, the correspondence between the communication standard utilized in communication by the cellular phone, or the like and the signaling system of the television signal may be varied appropriately to meet an actual situation in each region. In this case, the mobile terminal device 50A is equipped with two radio portions 2 and 3, but one radio portion may be provided when such one radio portion can respond selectively to plural types of communication standards. Also, respective correspondences between plural types of communication standards and the signaling systems of the television signal may be switched in response to which one of the radio portion 2 and the radio portion 3 is now operating.

In any event, when it is intended that the television signal is output from the mobile terminal device 50A shown in FIG. 1 and the images, and the like are displayed on any television set 8, the signal format of the television signal to be output by the TV-OUT signal outputting portion 7 is decided based on the signaling system that is selected automatically to meet the communication standard to which the radio portion 2 or the radio portion 3 in operation corresponds. As a consequence, in the regions (countries) in which the correspondence between the communication standard employed by the cellular phone, or the like and the signaling system employed by the television signal can be specified, the adequate television signal that conforms to the signaling system of the television set 8 can be selected automatically in respective regions while the user travels around various regions.

(Second Embodiment)

Another embodiment regarding to the mobile terminal device of the present invention will be explained with reference to FIG. 3 to FIG. 5 hereunder.

Figure 3:
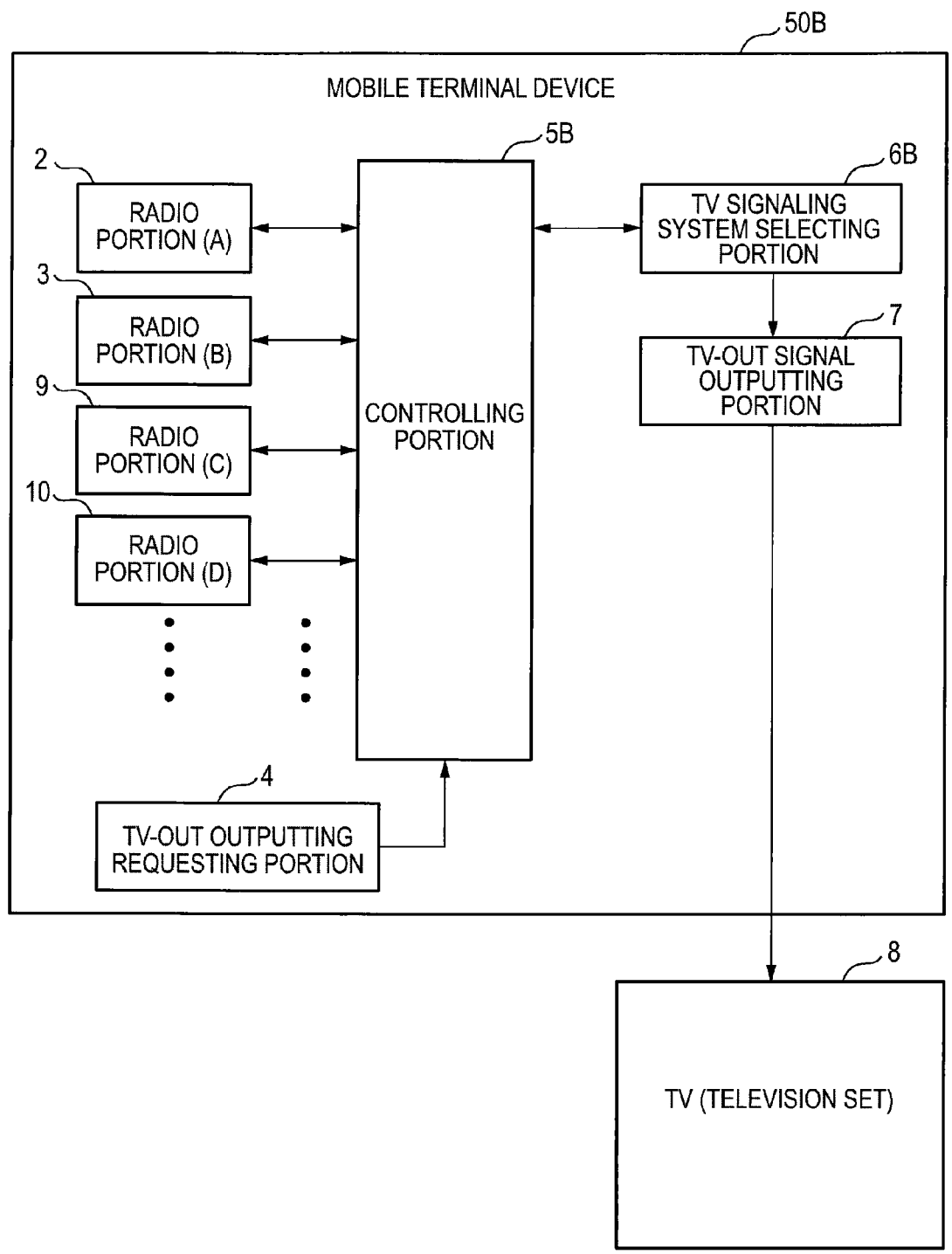
[FIG. 3] A block diagram showing a configuration of principal portions of a mobile terminal device in a second embodiment of the present invention.

FIG. 3 is a block diagram showing a configuration of principal portions of a mobile terminal device in a second embodiment of the present invention. FIG. 4 is a flowchart showing principal operations of the mobile terminal device shown in FIG. 3. FIG. 5 is a schematic view showing a configurative example of a table installed into the mobile terminal device shown in FIG. 3.

This embodiment is a variation of the first embodiment. Also, in FIG. 3, the same reference symbols are affixed to the elements corresponding to those in FIG. 1 in notation.

As shown in FIG. 3, a mobile terminal device 50B in this embodiment is equipped with the radio portion 2, the radio portion 3, a radio portion 9, a radio portion 10, the TV-OUT outputting requesting portion 4, a controlling portion 5B, a TV signaling system select portion 6B, and the TV-OUT signal outputting portion 7. Also, a table 21 shown in FIG. 5 is installed into the TV signaling system selecting portion 6B.

As the concrete mobile terminal device 50B, the cellular phone terminal, the mobile information terminal (PDA), the PHS terminal, or the like is assumed.

The radio portion 2, the radio portion 3, the radio portion 9, and the radio portion 10 are the circuit that has a radio communicating function required to implement a function of the cellular phone, etc. of the mobile terminal device 50B respectively. The radio portion 2, the radio portion 3, the radio portion 9, and the radio portion 10 are constructed to handle communication according to the predetermined communication standard (any one of PDC, CDMA2000, W-CDMA, GSM, etc. for example) respectively.

In this event, the communication standard to which the radio portion 2 corresponds, the communication standard to which the radio portion 3 corresponds, the communication standard to which the radio portion 9 corresponds, and the communication standard to which the radio portion 10 corresponds are different. That is, the user can hold the communications responding to four types of communication standards respectively, by employing selectively the radio portion 2, the radio portion 3, the radio portion 9, and the radio portion 10.

Actually, it is assumed that the radio portion 2 is constructed to conform to the communication standard of (GSM), the radio portion 3 is constructed to conform to the communication standard of (PDC), the radio portion 9 is constructed to conform to the communication standard of (W-CDMA), and the radio portion 10 is constructed to conform to the communication standard of (UMTS).

As a result, the user can hold the communication selectively in the communication mode responding to four types of communication standards respectively, by switching the radio portion 2, the radio portion 3, the radio portion 9, and the radio portion 10 in use. Therefore, the user can establish the communication according to the communication standard to which the signaling system corresponds. In this case, the communication standards to which the radio portions 2, 3, 9, 10 correspond respectively may be varied in response to a situation of the region where the mobile terminal device 50B is sold, for example. Also, the number of radio portions provided to the mobile terminal device 50B may be further increased.

The TV-OUT signal outputting portion 7 shown in FIG. 3 is the electric circuit that outputs the television signal in the standard format specified by the standard to the television set 8 connected to the outside of the mobile terminal device 50B. Also, the TV-OUT signal outputting portion 7 corresponds to plural types of signaling systems (NTSC, PAL, SECAM), and can output the analog television signals in the standard format that meets the selected signaling system.

It is assumed that, in the television signal output by the TV-OUT signal outputting portion 7, information of images such as a photograph, a moving picture, etc. shot with a camera (not shown) installed into the mobile terminal device 50B and sounds, for example, are contained in the analog signal mode. As the television set 8 connected to the outside of the mobile terminal device 50B, the television receiver equipped with a function of receiving the broadcast wave, the television monitor equipped with a function of displaying the television signal that various equipments output on a screen, or the like is assumed.

The TV signaling system selecting portion 6B shown in FIG. 3 produces a control signal that switches the signal format of the television signal, which is output from the TV-OUT signal outputting portion 7 to the television set 8, to meet the signaling system and then outputs this control signal to the TV-OUT signal outputting portion 7.

The table 21 constructed as shown in FIG. 5 is provided in the TV signaling system selecting portion 6B. The information representing the correspondences between the communication standards (GSM, PDC, W-CDMA, UMTS, etc.) and the signaling systems (PAL, NTSC, SECAM, etc.), which are allocated to plural radio portions 2, 3, 9, 10 in the mobile terminal device 50B respectively, are held in the table 21. Therefore, by reference to the contents of the table 21, the TV signaling system selecting portion 6B can correlate respective radio portions 2, 3, 9, 10 with the particular signaling system (any one of PAL, NTSC, SECAM, etc.) and can correlate each communication standard (any one of GSM, PDC, W-CDMA, UMTS, etc.) with the particular signaling system.

The TV-OUT outputting requesting portion 4 shown in FIG. 3 is constructed by an inputting device such as an operable button, for example. The TV-OUT outputting requesting portion 4 issues a request (TV-OUT outputting request) regarding to that the TV-OUT signal outputting portion 7 starts the operation to output the analog television signal in the standard signaling system, in response to the inputting operation of the user. This request is applied to the controlling portion 5B.

The controlling portion 5B shown in FIG. 3 controls respective portions in the mobile terminal device 50B in answer to the contents of the predetermined program and a change in situation. In this case, the controlling portion 5B may be constructed by a microprocessor or may be constructed by a hardware such as a logic circuit dedicated to control use.

Figure 4:
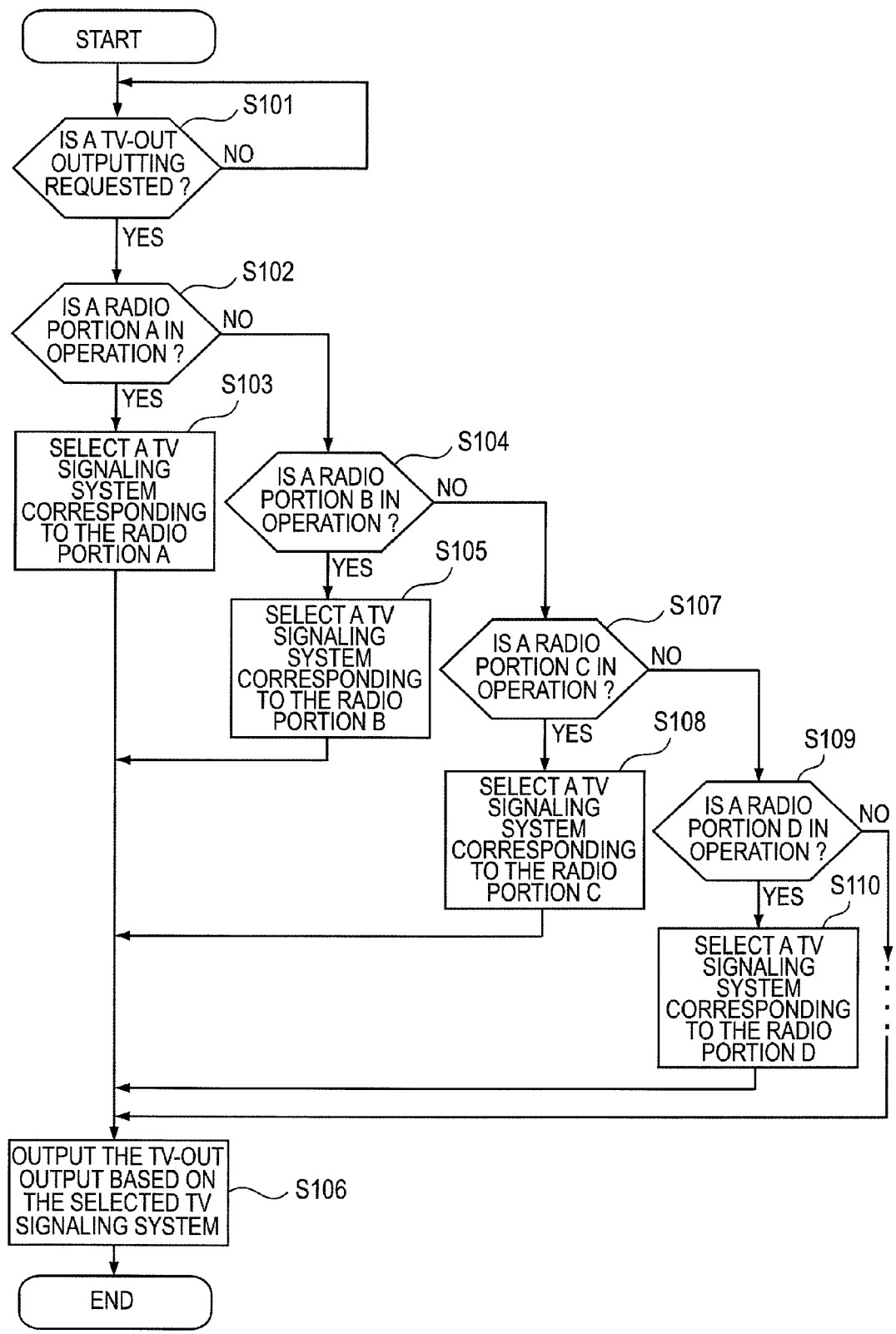
[FIG. 4] A flowchart showing principal operations of the mobile terminal device shown in FIG. 3.

The process procedures of characteristic operations regarding to the mobile terminal device 50B shown in FIG. 3 are shown in FIG. 4. In other words, contents of control applied to output the television signal in the standard format from the TV-OUT signal outputting portion 7 in the mobile terminal device 50B and then input the television signal into the television set 8 are shown in FIG. 4. Respective steps in FIG. 4 will be explained hereunder.

In step S101, the controlling portion 5B checks whether or not a predetermined TV-OUT outputting request is input from the TV-OUT outputting requesting portion 4. If the TV-OUT outputting requesting portion 4 outputs the TV-OUT outputting request in response to the inputting operation from the user, or the like, the process in the controlling portion 5 goes to step S102.

In step S102, the controlling portion 5B checks whether or not the first radio portion (A) 2 is in operation. If the radio portion 2 is in operation, the controlling portion 5B transmits the information indicating that the radio portion 2 is in operation, to the TV signaling system selecting portion 6B. Then, the process goes to step S103. In contrast, if the radio portion 2 is not in operation, the process goes to step S004.

In step S103, the TV signaling system selecting portion 6B checks a state of the radio portion 2 based on the information input from the controlling portion 5B (the information indicating that the radio portion 2 is in operation). Then, the TV signaling system selecting portion 6B produces the control signal to select the signaling system (any one of NTSC, PAL, and SECAM.) that is correlated in advance with the communication standard (any one of PDC, CDMA2000, W-CDMA, and GSM, for example) to which the radio portion 2 corresponds. Then, the TV signaling system selecting portion 6B outputs this control signal to the TV-OUT signal outputting portion 7.

Actually, since the table 21 shown in FIG. 5 is provided to the TV signaling system selecting portion 6B, the TV signaling system selecting portion 6B specifies one signaling system, which is correlated with the information input from the controlling portion 5B, by referring to the contents of the table 21. That is, in an example shown in FIG. 5, the communication standard of the radio portion (A) 2 is (GSM) and is correlated with the signaling system of (PAL). Therefore, the TV signaling system selecting portion 6B produces the control signal such that the TV-OUT signal outputting portion 7 selects the signaling system of (PAL).

In step S104, the controlling portion 5B checks whether or not the second radio portion (B) 3 is in operation. If the radio portion 3 is in operation, the controlling portion 5B transmits the information indicating that the radio portion 3 is in operation, to the TV signaling system selecting portion 6B. Then, the process goes to step S105. In contrast, if the radio portion 3 is not in operation, the process goes to step S107.

In step S105, the TV signaling system selecting portion 6B checks a state of the radio portion 3 based on the information input from the controlling portion 5B (the information indicating that the radio portion 3 is in operation). Then, the TV signaling system selecting portion 6B produces the control signal to select the signaling system (any one of NTSC, PAL, and SECAM) that is correlated in advance with the communication standard (any one of PDC, CDMA2000, W-CDMA, and GSM, for example) to which the radio portion 3 corresponds. Then, the TV signaling system selecting portion 6B outputs this control signal to the TV-OUT signal outputting portion 7.

Actually, like step S103, the TV signaling system selecting portion 6B specifies one signaling system, which is correlated with the information input from the controlling portion 5B, by referring to the contents of the table 21. That is, in the example shown in FIG. 5, the communication standard of the radio portion (B) 3 is (PDC) and is correlated with the signaling system of (NTSC). Therefore, the TV signaling system selecting portion 6B produces the control signal such that the TV-OUT signal outputting portion 7 selects the signaling system of (NTSC).

In step S107, the controlling portion 5B checks whether or not the third radio portion (C) 9 is in operation. If the radio portion 9 is in operation, the controlling portion 5B transmits the information indicating that the radio portion 9 is in operation, to the TV signaling system selecting portion 6B. Then, the process goes to step S108. In contrast, if the radio portion 9 is not in operation, the process goes to step S109.

In step S108, the TV signaling system selecting portion 6B checks a state of the radio portion 9 based on the information input from the controlling portion 5B (the information indicating that the radio portion 9 is in operation). Then, the TV signaling system selecting portion 6B produces the control signal to select the signaling system (any one of NTSC, PAL, and SECAM) that is correlated in advance with the communication standard (any one of PDC, CDMA2000, W-CDMA, and GSM, for example) to which the radio portion 9 corresponds. Then, the TV signaling system selecting portion 6B outputs this control signal to the TV-OUT signal outputting portion 7.

Actually, like step S103, the TV signaling system selecting portion 6B specifies one signaling system, which is correlated with the information input from the controlling portion 5B, by referring to the contents of the table 21. That is, in the example shown in FIG. 5, the communication standard of the radio portion (C) 9 is (W-CDMA) and is correlated with the signaling system of (NTSC). Therefore, the TV signaling system selecting portion 6B produces the control signal such that the TV-OUT signal outputting portion 7 selects the signaling system of (NTSC).

In step S109, the controlling portion 5B checks whether or not the fourth radio portion (D) 10 is in operation. If the radio portion 10 is in operation, the controlling portion 5B transmits the information indicating that the radio portion 10 is in operation, to the TV signaling system selecting portion 6B. Then, the process goes to step S110. In contrast, if the radio portion 10 is not in operation, the process goes to other process.

In step S110, the TV signaling system selecting portion 6B checks a state of the radio portion 10 based on the information input from the controlling portion 5B (the information indicating that the radio portion 10 is in operation). Then, the TV signaling system selecting portion 6B produces the control signal to select the signaling system (any one of NTSC, PAL, and SECAM) that is correlated in advance with the communication standard (any one of PDC, CDMA2000, W-CDMA, and GSM, for example) to which the radio portion 10 corresponds. Then, the TV signaling system selecting portion 6B outputs this control signal to the TV-OUT signal outputting portion 7.

Actually, like step S103, the TV signaling system selecting portion 6B specifies one signaling system, which is correlated with the information input from the controlling portion 5B, by referring to the contents of the table 21. That is, in the example shown in FIG. 5, the communication standard of the radio portion (D) 10 is (UMTS) and is correlated with the signaling system of (PAL). Therefore, the TV signaling system selecting portion 6B produces the control signal such that the TV-OUT signal outputting portion 7 selects the signaling system of (PAL).

In step S106, the TV-OUT signal outputting portion 7 selects one signaling system (any one of NTSC, PAL, and SECAM) in accordance with the control signal output from the TV signaling system selecting portion 6B, and outputs the television signal in the signal format that meets the communication standard.

In other words, if the radio portion 2 is in an operation state, the signaling system to define the signal format of the television signal that the TV-OUT signal outputting portion 7 outputs is selected automatically based on the communication standard to which the radio portion 2 corresponds. Also, if the radio portion 2 is not in an operation state and the radio portion 3 is in an operation state, the signaling system to define the signal format of the television signal to be output by the TV-OUT signal outputting portion 7 is selected automatically based on the communication standard to which the radio portion 3 corresponds. Also, if the radio portions 2, 3 are not in an operation state and the radio portion 9 is in an operation state, the signaling system to define the signal format of the television signal to be output by the TV-OUT signal outputting portion 7 is selected automatically based on the communication standard to which the radio portion 9 corresponds. Also, if all the radio portions 2, 3, 9 are not in an operation state and the radio portion 10 is in an operation state, the signaling system to define the signal format of the television signal to be output by the TV-OUT signal outputting portion 7 is selected automatically based on the communication standard to which the radio portion 10 corresponds.

The correspondence between the communication standards and the signaling systems of the television signals being registered in advance on the table 21 in the TV signaling system selecting portion 6B may be decided adequately in response to an actual situation of the signaling system in respective regions (countries). Also, for example, plural types of tables whose contents are different respectively may be prepared as the table 21, and then the table to be employed actually may be selected by a switch, or the like.

In any event, when it is intended that the television signal is output from the mobile terminal device 50B shown in FIG. 3 and the images, and the like are displayed on any television set 8, the signal format of the television signal to be output by the TV-OUT signal outputting portion 7 is decided based on the signaling system that is selected automatically to meet the communication standard to which either of the radio portions 2, 3, 9, 10 in operation corresponds. As a consequence, in the regions (countries) in which the correspondence between the communication standard employed by the cellular phone, or the like and the signaling system employed by the television signal can be specified, the adequate television signal that conforms to the signaling system of the television set 8 can be selected automatically in respective regions while the user travels around various regions. In particular, even when there exist various communication standards, the adequate signaling system to be selected can be simply specified by managing the correspondence between the communication standards and the signaling systems while using the table 21.

(Third Embodiment)

Figure 6:
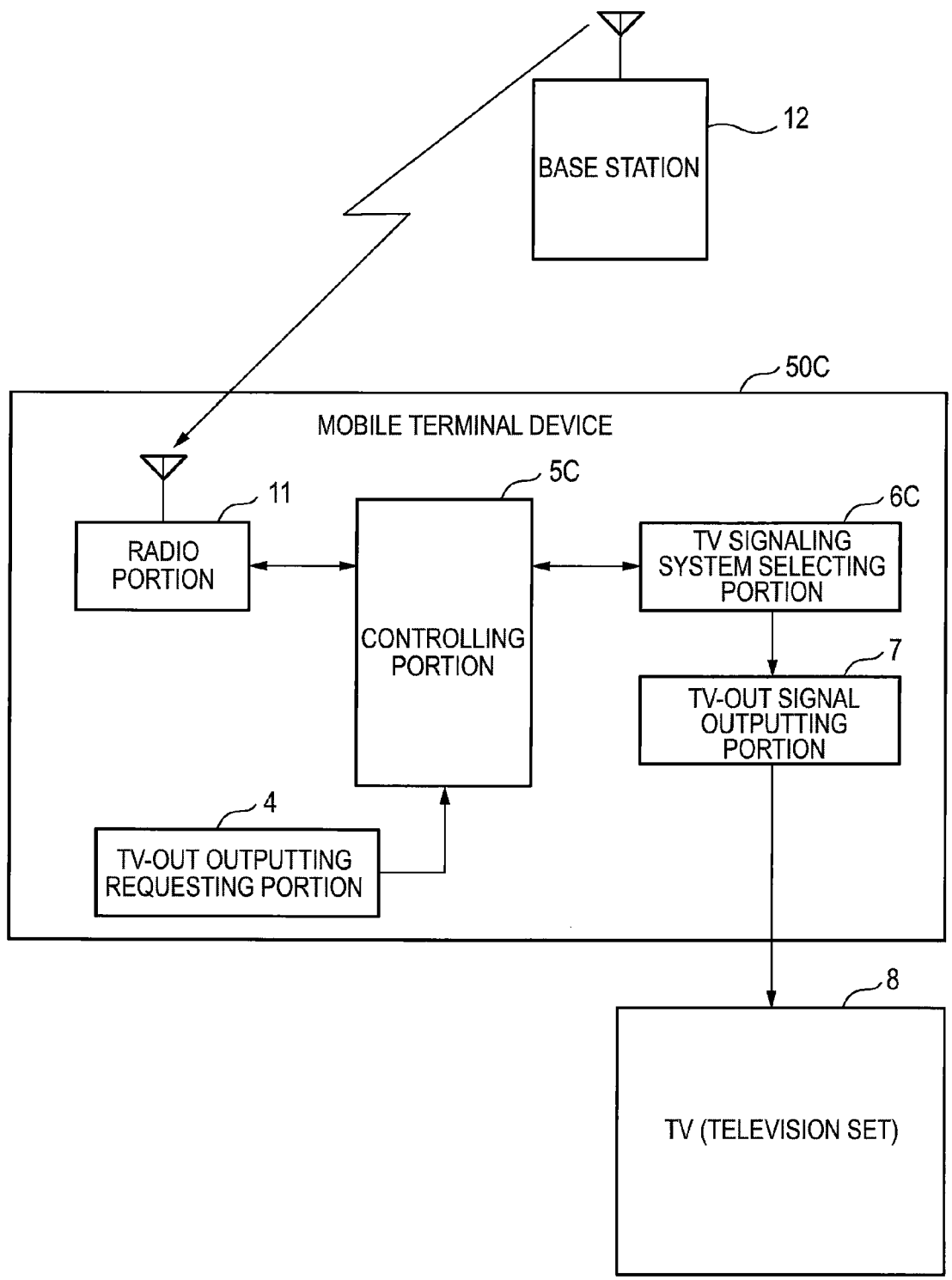
[FIG. 6] A block diagram showing a configuration of principal portions of a mobile terminal device in a third embodiment of the present invention.
Figure 7:
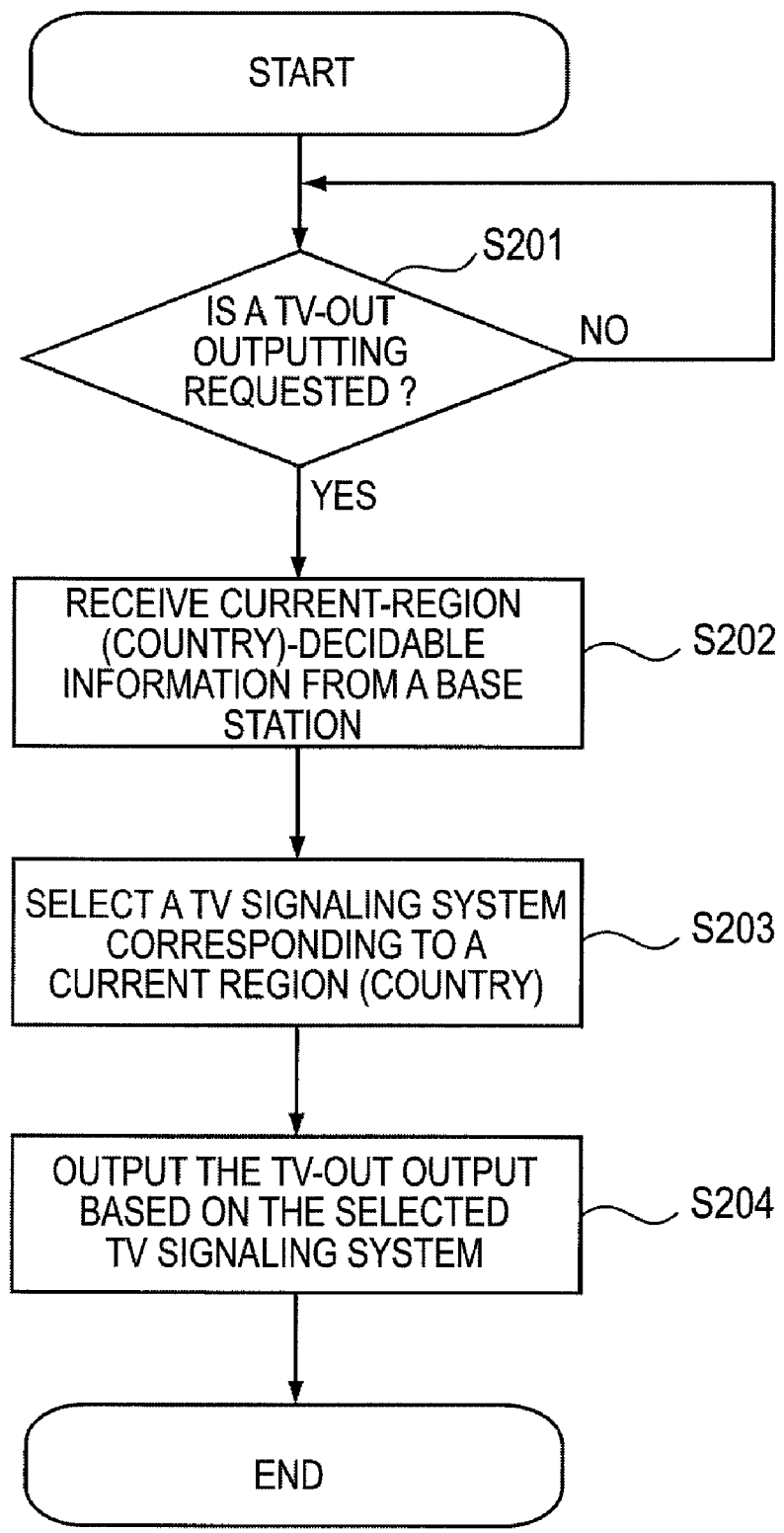
[FIG. 7] A flowchart showing principal operations of the mobile terminal device shown in FIG. 6.

Still another embodiment regarding to the mobile terminal device of the present invention will be explained with reference to FIG. 6 to FIG. 8 hereunder. FIG. 6 is a block diagram showing a configuration of principal portions of a mobile terminal device in a third embodiment of the present invention. FIG. 7 is a flowchart showing principal operations of the mobile terminal device shown in FIG. 6. FIG. 8 is a schematic view showing a configurative example of a table installed into the mobile terminal device shown in FIG. 6.

This embodiment is a variation of the first embodiment. Also, in FIG. 6, the same reference symbols are affixed to the elements corresponding to those in FIG. 1 in notation.

As shown in FIG. 6, a mobile terminal device 50C in this embodiment is equipped with a radio portion 11, the TV-OUT outputting requesting portion 4, a controlling portion 5C, a TV signaling system selecting portion 6C, and the TV-OUT signal outputting portion 7. Also, a table 22 shown in FIG. 8 is installed into the TV signaling system selecting portion 6C.

As the concrete mobile terminal device 50C, the cellular phone terminal, the mobile information terminal (PDA), the PHS terminal, or the like is assumed.

The radio portion 11 is the circuit that has a radio communicating function required to implement a function of the cellular phone, etc. of the mobile terminal device 50C. This radio portion 11 is constructed such that it can respond plural types of communication standards (PDC, CDMA2000, W-CDMA, GSM, etc. for example) respectively by switching its own mode, and can handle communication according to any communication standard. Also, the radio portion 11 can communicate with a base station 12 as the destination of radio communication, and can acquire information, by which the current region (the country in which the mobile terminal device is located, or the like) can be specified, from the base station 12.

The TV-OUT signal outputting portion 7 shown in FIG. 6 is the electric circuit that outputs the television signal in the standard format specified by the standard to the television set 8 connected to the outside of the mobile terminal device 50C. Also, the TV-OUT signal outputting portion 7 corresponds to plural types of signaling systems (NTSC, PAL, SECAM), and can output the analog television signals in the standard format that meets the selected signaling system.

It is assumed that, in the television signal output by the TV-OUT signal outputting portion 7, information of images such as a photograph, a moving picture, etc. shot with a camera (not shown) installed into the mobile terminal device 50C and sounds, for example, are contained in the analog signal mode. As the television set 8 connected to the outside of the mobile terminal device 50C, the television receiver equipped with a function of receiving the broadcast wave, the television monitor equipped with a function of displaying the television signal that various equipments output on a screen, or the like is assumed.

The TV signaling system selecting portion 6C shown in FIG. 6 produces a control signal that switches the signal format of the television signal, which is output from the TV-OUT signal outputting portion 7 to the television set 8, to meet the signaling system, and then outputs this control signal to the TV-OUT signal outputting portion 7.

The table 22 constructed as shown in FIG. 8 is provided in the TV signaling system selecting portion 6C. The information representing the signaling systems (PAL, NTSC, SECAM, etc.) that are employed as the signaling system of the television signal in plural regions (countries) respectively are held in the table 21.

Therefore, when the country in which the mobile terminal device is located can be specified, the TV signaling system selecting portion 6C can specify the signaling system (any one of PAL, NTSC, SECAM, etc.) to be selected, by referring to the contents of the table 22.

The TV-OUT outputting requesting portion 4 shown in FIG. 6 is constructed by an inputting device such as an operable button, for example. The TV-OUT outputting requesting portion 4 issues a request (TV-OUT outputting request) regarding to that the TV-OUT signal outputting portion 7 starts the operation to output the analog television signal in the standard signaling system, in response to the inputting operation of the user. This request is applied to the controlling portion 5C.

The controlling portion 5C shown in FIG. 6 controls respective portions in the mobile terminal device 50C in answer to the contents of the predetermined program and a change in situation. In this case, the controlling portion 5C may be constructed by a microprocessor or may be constructed by a hardware such as a logic circuit dedicated to control use.

The process procedures of characteristic operations regarding to the mobile terminal device 50C shown in FIG. 6 are shown in FIG. 7. In other words, contents of control applied to output the television signal in the standard format from the TV-OUT signal outputting portion 7 in the mobile terminal device 50C and then input the television signal into the television set 8 are shown in FIG. 7. Respective steps in FIG. 7 will be explained hereunder.

In step S201, the controlling portion 5C checks whether or not a predetermined TV-OUT outputting request is input from the TV-OUT outputting requesting portion 4. If the TV-OUT outputting requesting portion 4 outputs the TV-OUT outputting request in response to the inputting operation from the user, or the like, the process in the controlling portion 5C goes to step S202.

In step S202, in accordance with the instruction of the controlling portion 5C, the radio portion 11 requests region information containing the information representing the country, in which the mobile terminal device is located currently, of the base station 12. In response to this request, the base station 12 transmits the region information the containing the information representing the country in which the mobile terminal device is located. Then, the radio portion 11 informs the region information acquired from the base station 12 of the controlling portion 5C. Also, the controlling portion 5C informs the contents of the region information (distinction of countries) informed from the radio portion 11 of the TV signaling system selecting portion 6C.

In step S203, the TV signaling system selecting portion 6C produces the control signal to select the appropriate signaling system (any one of NTSC, PAL, and SECAM) of the television signal in the current region (country) based on the contents of the region information (distinction of countries) informed from the controlling portion 5C, and then outputs this control signal to the TV-OUT signal outputting portion 7.

Actually, since the table 22 is provided to the TV signaling system selecting portion 6C, the TV signaling system selecting portion 6C specifies one signaling system, which is correlated with the current region (country), by referring to the contents of the table 22. For example, in case the table 22 shown in FIG. 8 is employed, the TV signaling system selecting portion 6C produces the control signal such that (NTSC) is selected automatically as the signaling system when the current region (country) detected is "Japan", (PAL) is selected automatically as the signaling system when the current region (country) is "Spain", and (SECAM) is selected automatically as the signaling system when the current region (country) is "France".

In step S204, the TV-OUT signal outputting portion 7 selects one signaling system (any one of NTSC, PAL, and SECAM) in accordance with the control signal output from the TV signaling system selecting portion 6C, and outputs the television signal in the signal format that meets the communication standard.

The correspondence between the countries and the signaling systems of the television signals being registered in advance on the table 22 in the TV signaling system selecting portion 6C may be decided adequately in response to the actual signaling system of the television broadcast in respective regions (countries). Also, for example, plural types of tables whose contents are different respectively may be prepared as the table 22, and then the table to be employed actually may be selected by a switch, or the like. Also, the number of countries registered on the table 22 may be increased as occasion demands.

Also, in the mobile terminal device 50C shown in FIG. 6, the case where the region information representing the countries are acquired from the base station 12 is assumed. But the information representing the communication standard (distinctions such as PDC, CDMA2000, W-CDMA, GSM, etc., for example) to which the system corresponds may be acquired instead of the region information. In such case, the foregoing table 21 may be employed instead of the table 22.

In any event, when it is intended that the television signal is output from the mobile terminal device 50C shown in FIG. 6 and the images, and the like are displayed on any television set 8, the signaling system employed in the region (country) in which the mobile terminal device is located at present is identified automatically, and also the signal format of the television signal to be output by the TV-OUT signal outputting portion 7 is decided adequately. As a consequence, when the user travels around various regions, the adequate television signal that conforms to the signaling system of the television set 8 can be selected automatically in respective regions. In particular, the adequate signaling system to be selected in various countries can be simply specified by managing the correspondence between the regions and the signaling systems while using the table 22.

(Fourth Embodiment)

Figure 9:
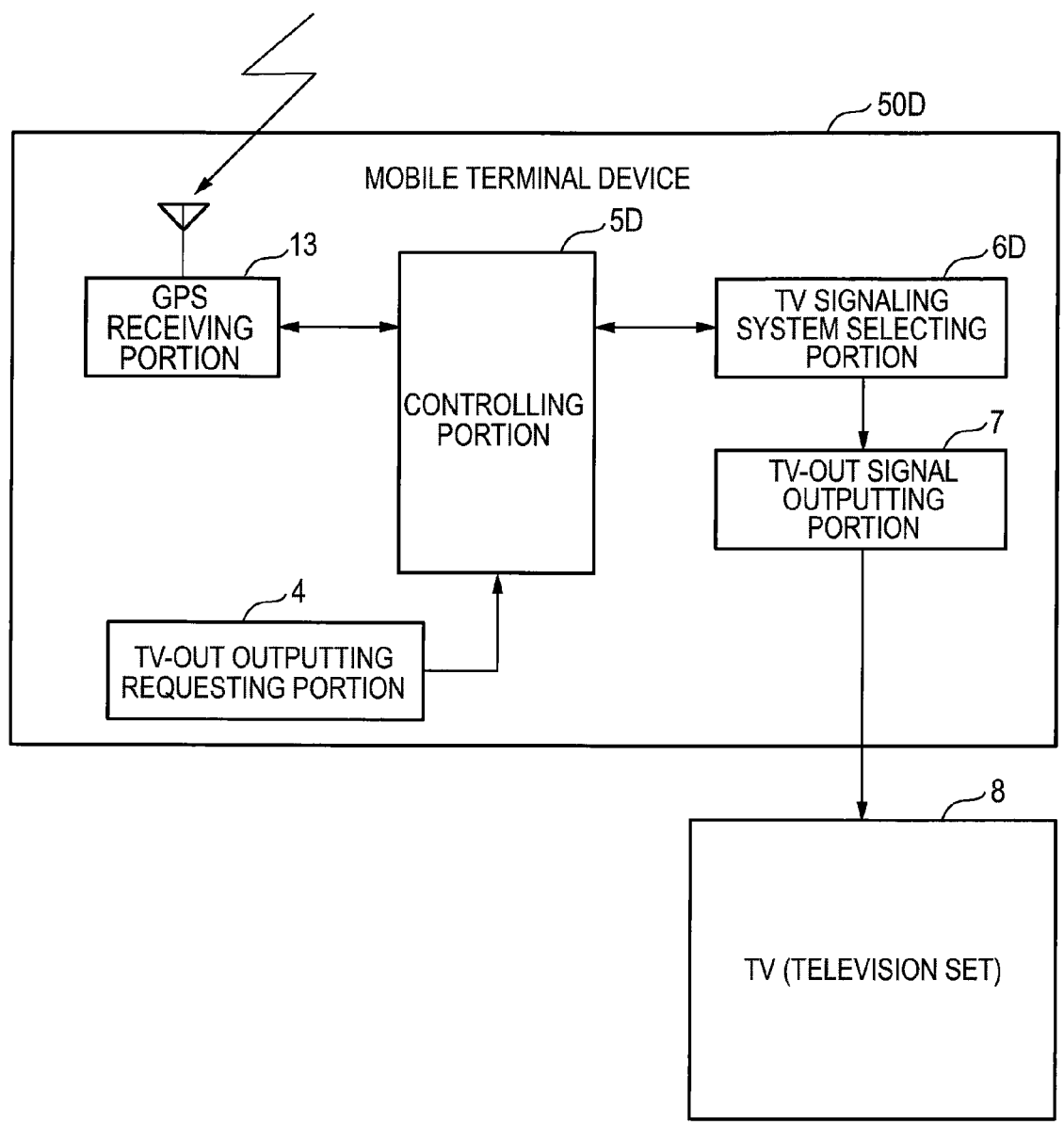
[FIG. 9] A block diagram showing a configuration of principal portions of a mobile terminal device in a third embodiment of the present invention.
Figure 10:
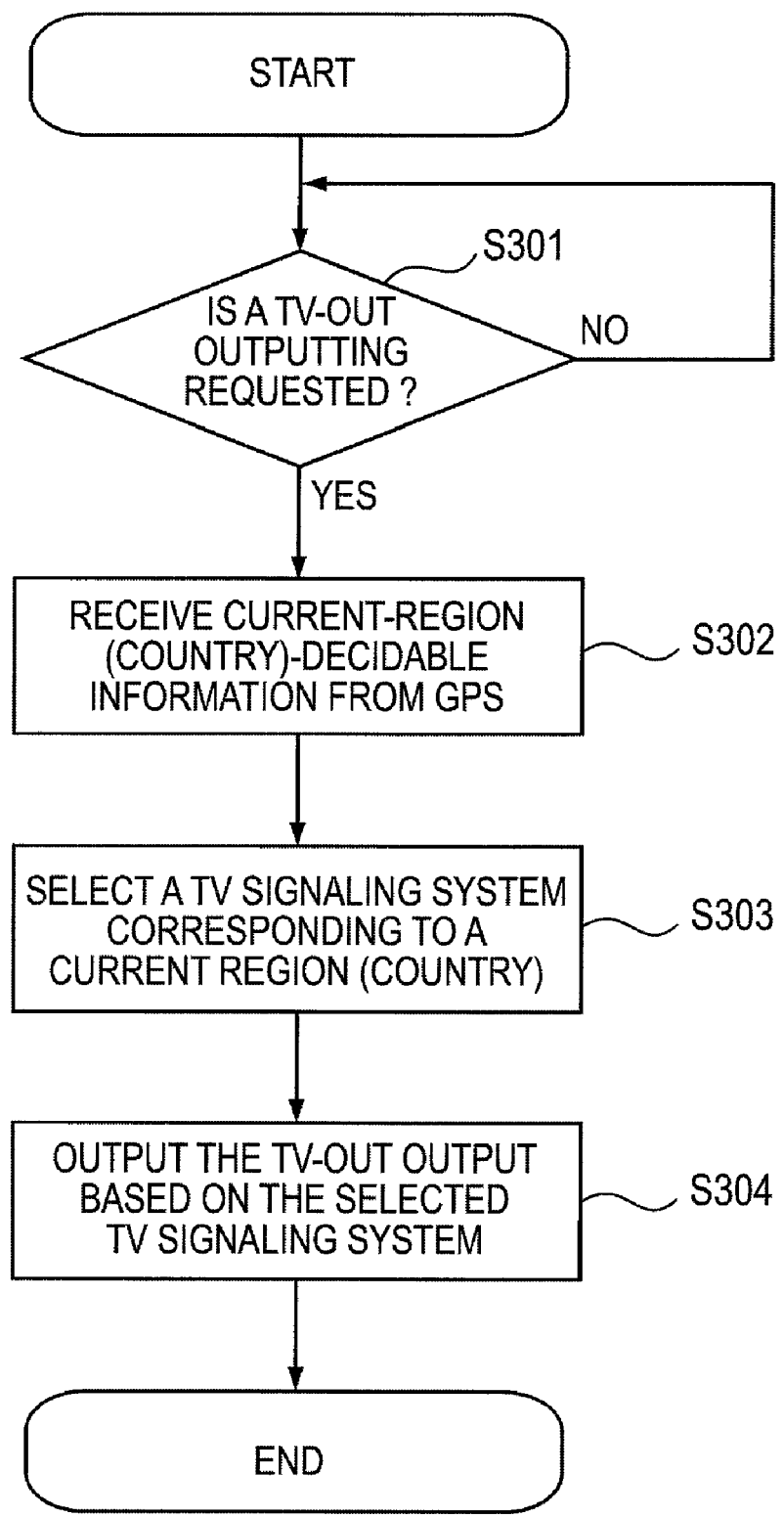
[FIG. 10] A flowchart showing principal operations of the mobile terminal device shown in FIG. 9.

Further embodiment regarding to the mobile terminal device of the present invention will be explained with reference to FIG. 9 and FIG. 10 hereunder. FIG. 9 is a block diagram showing a configuration of principal portions of a mobile terminal device in a third embodiment of the present invention. FIG. 10 is a flowchart showing principal operations of the mobile terminal device shown in FIG. 9.

This embodiment is a variation of the first embodiment. Also, in FIG. 9, the same reference symbols are affixed to the elements corresponding to those in FIG. 1 in notation.

As shown in FIG. 9, a mobile terminal device 50D is equipped with a GPS receiving portion 13, the TV-OUT outputting requesting portion 4, a controlling portion 5D, a TV signaling system selecting portion 6D, and the TV-OUT signal outputting portion 7.

As the concrete mobile terminal device 50D, the cellular phone terminal, the mobile information terminal (PDA), the PHS terminal, or the like is assumed.

The GPS receiving portion 13 can receive simultaneously radio waves from a plurality of GPS (Global Positioning System) satellites, and then calculate information representing coordinates (latitude/longitude) of the position where the terminal device itself is located. In this case, a commercially available GPS receiver can be used as the GPS receiving portion 13.

The TV-OUT signal outputting portion 7 shown in FIG. 9 is the electric circuit that outputs the television signal in the standard format specified by the standard to the television set 8 connected to the outside of the mobile terminal device 50D. Also, the TV-OUT signal outputting portion 7 corresponds to plural types of signaling systems (NTSC, PAL, SECAM), and can output the analog television signals in the standard format that meets the selected signaling system.

It is assumed that, in the television signal output by the TV-OUT signal outputting portion 7, information of images such as a photograph, a moving picture, etc. shot with a camera (not shown) installed into the mobile terminal device 50D and sounds, for example, are contained in the analog signal mode. As the television set 8 connected to the outside of the mobile terminal device 50D, the television receiver equipped with a function of receiving the broadcast wave, the television monitor equipped with a function of displaying the television signal that various equipments output on a screen, or the like is assumed.

The TV signaling system selecting portion 6D shown in FIG. 9 produces a control signal that switches the signal format of the television signal, which is output from the TV-OUT signal outputting portion 7 to the television set 8, to meet the signaling system, and then applies this control signal to the TV-OUT signal outputting portion 7.

The TV-OUT outputting requesting portion 4 shown in FIG. 9 is constructed by an inputting device such as an operable button, for example. The TV-OUT outputting requesting portion 4 issues a request (TV-OUT outputting request) regarding to that the TV-OUT signal outputting portion 7 starts the operation to output the analog television signal in the standard signaling system, in response to the inputting operation of the user. This request is applied to the controlling portion 5C.

The controlling portion 5D shown in FIG. 9 controls respective portions in the mobile terminal device 50D in answer to the contents of the predetermined program and a change in situation. In this case, the controlling portion 5D may be constructed by a microprocessor or may be constructed by a hardware such as a logic circuit dedicated to control use.

The process procedures of characteristic operations regarding to the mobile terminal device 50D shown in FIG. 9 are shown in FIG. 10. In other words, contents of control applied to output the television signal in the standard format from the TV-OUT signal outputting portion 7 in the mobile terminal device 50B and then input the television signal into the television set 8 are shown in FIG. 10. Respective steps in FIG. 10 will be explained hereunder.

In step S301, the controlling portion 5D checks whether or not a predetermined TV-OUT outputting request is input from the TV-OUT outputting requesting portion 4. If the TV-OUT outputting requesting portion 4 outputs the TV-OUT outputting request in response to the inputting operation from the user, or the like, the process in the controlling portion 5D goes to step S302.

In step S302, in accordance with the instruction of the controlling portion 5D, the GPS receiving portion 13 receives simultaneously the radio waves from a plurality of GPS satellites, and then calculates information of the latitude/longitude representing the current position where the terminal device itself is located, based on the signals of the received radio waves. The controlling portion 5D is informed of the position information calculated by the GPS receiving portion 13. The controlling portion 5D specifies the concerned region (country) based on the position information of latitude/longitude given from the GPS receiving portion 13, and sends the information indicating the specified region to the TV signaling system selecting portion 6D.

In step S303, the TV signaling system selecting portion 6D produces the control signal to select the appropriate signaling system (any one of NTSC, PAL, and SECAM) of the television signal in the current region (country) based on the contents of the region information (distinction of countries) given by the controlling portion 5D, and then outputs this control signal to the TV-OUT signal outputting portion 7. For example, the signaling system (NTSC, PAL, SECAM, or the like) of the television signal employed at present in the region (country) by utilizing the foregoing table 22.

For example, in case the table 22 shown in FIG. 8 is employed, the control signals are produced respectively such that (NTSC) is selected automatically as the signaling system when the region (country) containing the detected current position is "Japan", (PAL) is selected automatically as the signaling system when the region (country) containing the detected current position is "Spain", and (SECAM) is selected automatically as the signaling system when the region (country) containing the detected current position is "France".

In step S304, the TV-OUT signal outputting portion 7 selects one signaling system (any one of NTSC, PAL, and SECAM) in accordance with the control signal output from the TV signaling system selecting portion 6D, and outputs the television signal in the signal format that meets the communication standard.

In the mobile terminal device 50D shown in FIG. 9, the case where a function of identifying the region (country) by the coordinates of the current position is provided to the controlling portion 5D is assumed. But either the region may be identified on the GPS receiving portion 13 side or the region may be identified by the position coordinates on the TV signaling system selecting portion 6D side. In this event, it is desirable that, like other embodiments, at least one radio portion should also be incorporated into the mobile terminal device 50D.

In any event, when it is intended that the television signal is output from the mobile terminal device 50D shown in FIG. 9 and the images, and the like are displayed on any television set 8, the signaling system employed in the region (country) in which the mobile terminal device is located at present is identified automatically by utilizing the radio waves from the GPS satellites, and also the signal format of the television signal to be output by the TV-OUT signal outputting portion 7 is decided adequately. As a result, when the user travels around various regions, the adequate television signal that conforms to the signaling system of the television set 8 can be selected automatically in respective regions. In particular, the adequate signaling system to be selected in various countries can be simply specified by managing the correspondence between the regions and the signaling systems while using the table 22.

As the method of detecting the coordinates of the current position, various methods can be considered other than the method of employing the GPS receiving portion 13.

The present invention is explained in detail with reference to the particular embodiments. But it is apparent for those skilled in the art that various variations and modifications can be applied without departing from a spirit and a scope of the present invention.

INDUSTRIAL APPLICABILITY

As described above, because the present invention is applied to the mobile terminal device such as the cellular phone terminal, the mobile information terminal, the PHS terminal, or the like, for example, the television signal, and the like can be output in an adequate signal format to meet automatically the signaling system employed in respective regions in such a situation that the user who carries the mobile terminal device travels across various regions (countries). Therefore, there is no necessity to use selectively a plurality of mobile terminal devices to suit each region, and also it is not necessary for the user to check the signaling system.

The invention claimed is:

1. A mobile terminal device comprising: at least two radio communicating portions capable of holding a radio communication in accordance with a predetermined cellular communication standard; a standard television signal outputting portion for outputting a television signal in a format based on a predetermined television signaling system to an external display device; a communication standard detector that detects a type of the cellular communication standard selected based on an operating condition or conditions of one or a plurality of radio communicating portions when one of the radio communicating portions conforms to plural types of cellular communication standards or when the plurality of radio communicating portions conform to plural types of cellular communication standards; and a television signaling system selector that, based on the type of the cellular communication standard detected by the communication standard detector, selects automatically a correlated television signaling system of the television signal to be output by the standard television signal outputting portion.

2. The mobile terminal device according to claim 1, further comprising:
a conversion table in which information representing television signaling systems that are correlated with a plurality of cellular communication standards respectively are held in advance,
wherein the television signaling system selector acquires information representing the concerned television signaling system by referring to the conversion table based on the type of the cellular communication standard detected by the communication standard detector, and decides the format of the television signal to be output by the standard television signal outputting portion, based on the information.

3. The mobile terminal device according to claim 1, wherein, when a plurality of the radio communicating portions that conform to plural types of cellular communication standards respectively are provided, the communication standard detector checks whether or not the plurality of radio communicating portions are in operation respectively, and detects the type of the cellular communication standard to which the radio communicating portion that is in operation corresponds.

4. The mobile terminal device according to claim 1, wherein said plural types of cellular communication standards comprises at least one of GSM, PDC, W-CDMA, and UMTS.

5. The mobile terminal device according to claim 1, wherein said television signaling system includes at least one of NTSC, PAL and SECAM.

6. The mobile terminal device according to claim 2, wherein said plurality of cellular communication standards comprises at least one of GSM, PDC, W-CDMA, CDMA2000 and UMTS.

7. The mobile terminal device according to claim 2, wherein said television signaling systems include at least one of NTSC, PAL and SECAM.

8. A mobile terminal device comprising: each radio communicating portion capable of holding a radio communication in accordance with a plurality of predetermined cellular communication standards; a communication standard detector that detects a type of the cellular communication standard selected based on an operating condition or conditions of one or a plurality of radio communicating portions of the radio communicating portion when one of the radio communicating portions conforms to plural types of cellular communication standards or when the plurality of radio communicating portions conform to plural types of cellular communication standards respectively; a television signaling system selector that, based on the type of the cellular communication standard detected by the communication standard detector, automatically selects a correlated television signaling system; and a standard television signal outputting portion capable operating in accordance with a plurality of predetermined television signaling systems, wherein the standard television signal outputting portion outputs a television signal to an external display device in a format based on the correlated television signaling system selected by the television signaling system selector.

9. The mobile terminal device according to claim 8, wherein said plurality of cellular communication standards comprises at least one of GSM, PDC, W-CDMA, CDMA2000 and UMTS.

10. The mobile terminal device according to claim 8, wherein said plurality of television signaling systems include at least one of NTSC, PAL and SECAM.

11. A mobile terminal device comprising: a first radio communicating portion capable of holding a radio communication in accordance with a first predetermined cellular communication standard; a second radio communicating portion capable of holding a radio communication in accordance with a second predetermined cellular communication standard; a communication standard detector that detects a type of the cellular communication standard selected based on operating condition or conditions of one or a plurality of radio communicating portions when one of the radio communicating portions conforms to plural types of cellular communication standards or when the plurality of radio communicating portions conform to plural types of cellular communication standards of the first and second radio communicating portions; a television signaling system selector that, based on the type of the cellular communication standard detected by the communication standard detector, automatically selects a correlated television signaling system; and a standard television signal outputting portion capable operating in accordance with a plurality of predetermined television signaling systems, wherein the standard television signal outputting portion outputs a television signal to an external display device in a format based on the correlated television signaling system selected by the television signaling system selector.

12. The mobile terminal device according to claim 11, wherein said first predetermined cellular communication standard comprises at least one of GSM, PDC, W-CDMA, CDMA2000 and UMTS and wherein said first predetermined cellular communication standard comprises at least another one of GSM, PDC, W-CDMA, CDMA2000 and UMTS.

13. The mobile terminal device according to claim 11, wherein said plurality of television signaling systems include at least one of NTSC, PAL and SECAM.

* * * * *